United States Patent
Park et al.

(10) Patent No.: US 9,378,536 B2
(45) Date of Patent: Jun. 28, 2016

(54) CPU/GPU DCVS CO-OPTIMIZATION FOR REDUCING POWER CONSUMPTION IN GRAPHICS FRAME PROCESSING

(71) Applicant: QUALCOMM INCORPORATED, San Diego, CA (US)

(72) Inventors: Hee Jun Park, San Diego, CA (US); Young Hoon Kang, San Diego, CA (US); Mriganka Mondal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/266,685

(22) Filed: Apr. 30, 2014

(65) Prior Publication Data
US 2015/0317762 A1    Nov. 5, 2015

(51) Int. Cl.
*G06F 1/32* (2006.01)
*G06T 1/20* (2006.01)

(52) U.S. Cl.
CPC . *G06T 1/20* (2013.01); *G06F 1/324* (2013.01); *G06F 1/3206* (2013.01); *G06F 1/3228* (2013.01); *G06F 1/3296* (2013.01); *G09G 2330/021* (2013.01); *G09G 2360/06* (2013.01); *Y02B 60/1217* (2013.01); *Y02B 60/1285* (2013.01)

(58) Field of Classification Search
None
See application file for complete search history.

(56) References Cited

U.S. PATENT DOCUMENTS

| | | |
|---|---|---|
| 2007/0050647 A1 | 3/2007 | Conroy et al. |
| 2009/0109230 A1* | 4/2009 | Miller et al. ............ 345/506 |
| 2013/0007413 A1 | 1/2013 | Thomson et al. |
| 2013/0151869 A1 | 6/2013 | Steinman et al. |
| 2014/0168229 A1* | 6/2014 | Ungureanu et al. ........ 345/505 |
| 2015/0094995 A1* | 4/2015 | Allen-Ware et al. ........ 703/2 |

FOREIGN PATENT DOCUMENTS

WO    2012170213 A2    12/2012

OTHER PUBLICATIONS

Kai Ma et al., GreenGPU: A Holistic Approach to Energy Efficiency in GPU-CPU Heterogeneous Architectures, International Conference on Parallel Processing (ICPP), 2012. Sep. 2012.
Cong Liu et al, Power-Efficient Time-Sensitive Mapping in Heterogeneous Systems,PACT' 12, Sep. 19-23, 2012, Minnesota, USA.
(Continued)

*Primary Examiner* — Joni Richer
(74) *Attorney, Agent, or Firm* — Smith Tempel

(57) ABSTRACT

Systems, methods, and computer programs are disclosed for minimizing power consumption in graphics frame processing. One such method comprises: initiating graphics frame processing to be cooperatively performed by a central processing unit (CPU) and a graphics processing unit (GPU); receiving CPU activity data and GPU activity data; determining a set of available dynamic clock and voltage/frequency scaling (DCVS) levels for the GPU and the CPU; and selecting from the set of available DCVS levels an optimal combination of a GPU DCVS level and a CPU DCVS level, based on the CPU and GPU activity data, which minimizes a combined power consumption of the CPU and the GPU during the graphics frame processing.

16 Claims, 10 Drawing Sheets

(56) References Cited

OTHER PUBLICATIONS

George Teodoro et al, Coordinating the Use of GPU and CPU for Improving Performance of Compute Intensive Applications, Universidade Federal de Minas Gerais, The Ohio State University, Accessed on Mar. 11, 2014.

International Search Report and Written Opinion—PCT/US2015/028098—ISA/EPO—Jul. 21, 2015.

* cited by examiner

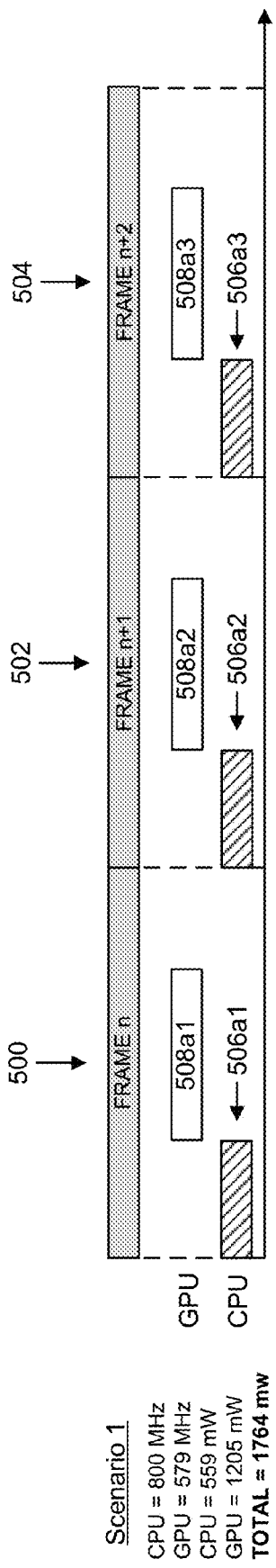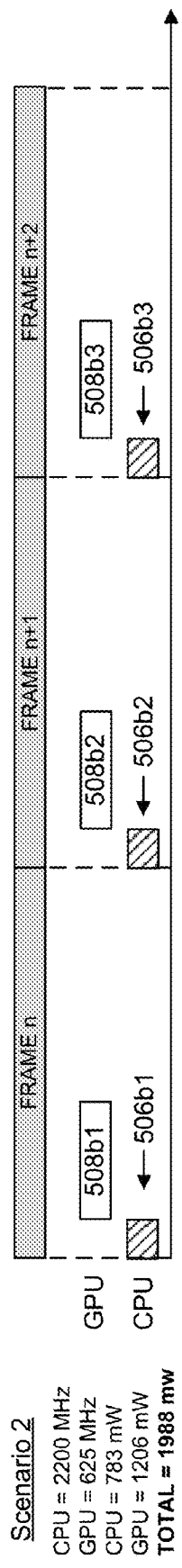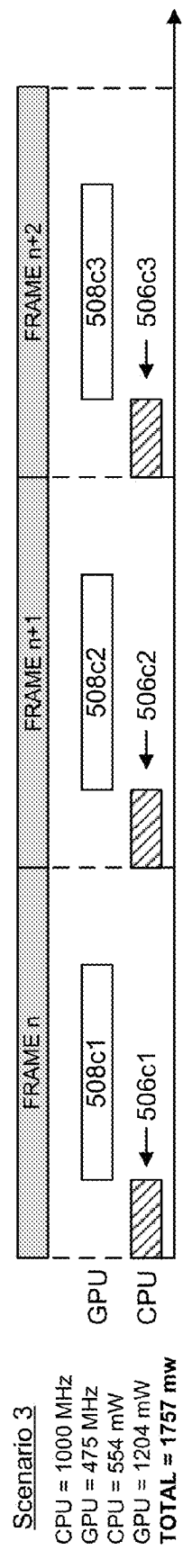

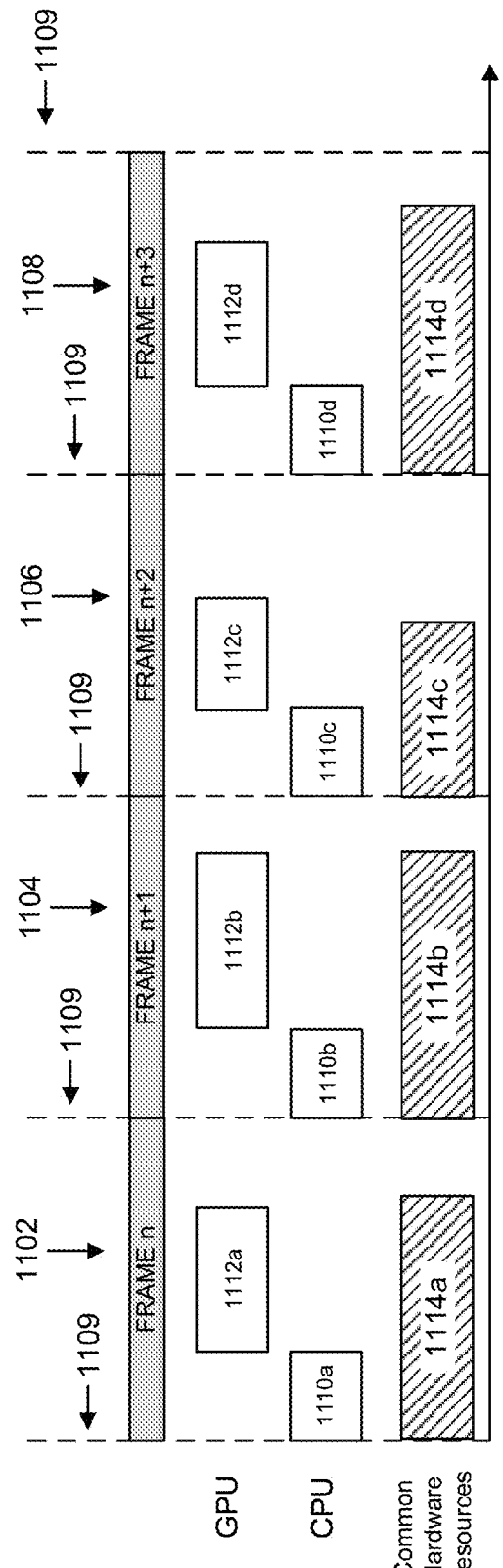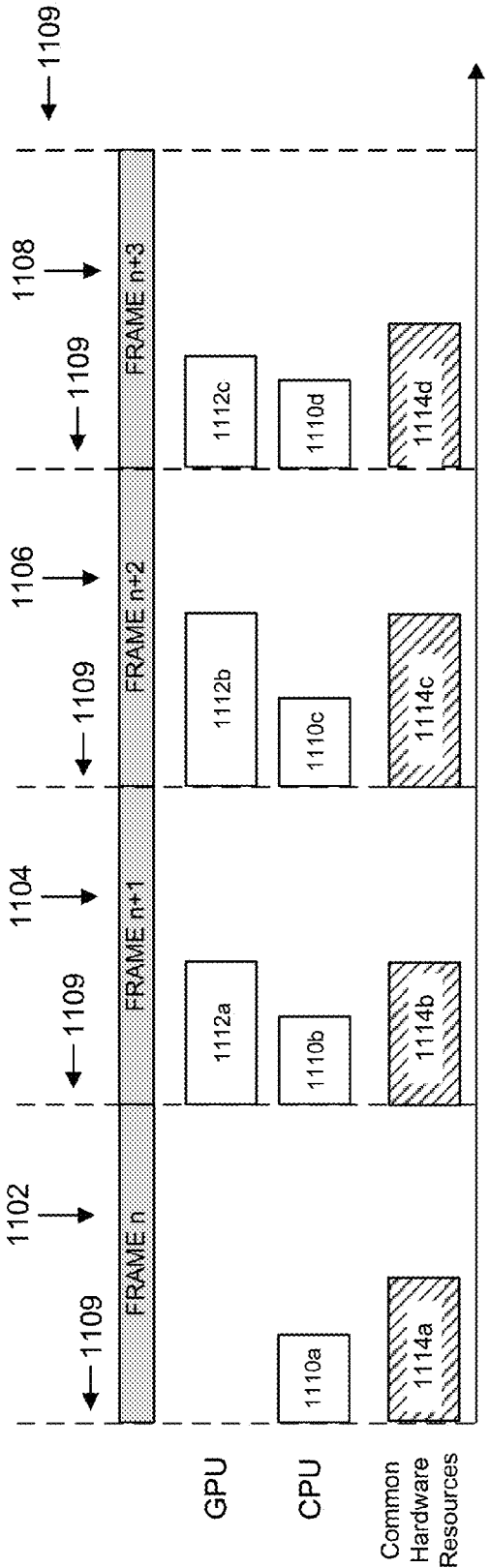

CPU/GPU DCVS CO-OPTIMIZATION FOR REDUCING POWER CONSUMPTION IN GRAPHICS FRAME PROCESSING

DESCRIPTION OF THE RELATED ART

Portable computing devices (e.g., cellular telephones, smart phones, tablet computers, portable digital assistants (PDAs), and portable game consoles) continue to offer an ever-expanding array of features and services, and provide users with unprecedented levels of access to information, resources, and communications. To keep pace with these service enhancements, such devices have become more powerful, more complex. Portable computing devices now commonly include system-on-chips (SoCs) and/or multiple microprocessor cores embedded on a single substrate (e.g., a central processing unit (CPU), graphics processing unit (GPU), etc.), allowing users to execute complex and power intensive software applications. However, increased performance and functionality requirements present significant design and operational challenges for managing battery life and power consumption.

Existing methods for managing power consumption of multiprocessor devices may involve dynamic clock and voltage scaling (DCVS) techniques. DCVS involves selectively adjusting the frequency and/or voltage applied to the processors, hardware devices, etc. to yield the desired performance and/or power efficiency characteristics. Conventional DCVS solutions exhibit a number of performance problems, and implementing an effective DCVS method that correctly scales frequency/voltage for each core of multicore processor system is an important and challenging design criterion. For example, DCVS techniques for multiprocessor systems (e.g., systems comprising a CPU and a GPU) require that each processor include a separate DCVS module/process and/or adjust the processor frequency/voltage independent of other processors. Furthermore, when performing graphics frame processing, the separate CPU and/or GPU DCVS algorithms are designed to optimize performance within the constraints presented by frame processing deadlines without regard to power efficiency optimization.

Accordingly, there remains a need in the art for improved systems and methods for optimizing DCVS for power efficiency in multiprocessor systems.

SUMMARY OF THE DISCLOSURE

Systems, methods, and computer programs are disclosed for minimizing power consumption in graphics frame processing. One such method comprises: initiating graphics frame processing to be cooperatively performed by a central processing unit (CPU) and a graphics processing unit (GPU); receiving CPU activity data and GPU activity data; determining a set of available dynamic clock and voltage/frequency scaling (DCVS) levels for the GPU and the CPU; and selecting from the set of available DCVS levels an optimal combination of a GPU DCVS level and a CPU DCVS level, based on the CPU and GPU activity data, which minimizes a combined power consumption of the CPU and the GPU during the graphics frame processing.

Another embodiment comprises a system for minimizing power consumption in graphics frame processing. One such system comprises a system on chip (SoC) including a central processing unit (CPU), a graphics processing unit (GPU), and a dynamic clock voltage and scaling (DCVS) controller in communication with the GPU and the CPU. A CPU/GPU DCVS co-optimization module is configured to determine an optimal combination of a GPU DCVS level and a CPU DCVS level for the DCVS controller, based on CPU and GPU activity data. The optimal combination of the GPU and CPU DCVS levels are selected to minimize a combined power consumption of the CPU and the GPU during graphics frame processing.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIGS. 5a-5c are a series of timing diagrams illustrating an embodiment of a CPU/GPU DCVS co-optimization method for CPU/GPU serialized graphics workloads.

FIG. 6 is a data table illustrating an exemplary CPU/GPU frequency space for co-optimizing GPU and CPU DCSV levels for minimal combined power consumption during graphics frame processing at a first CPU/GPU temperature.

FIG. 7 illustrates the data table of FIG. 6 for a second CPU/GPU temperature.

FIG. 8 illustrates the data table of FIG. 6 for a third CPU/GPU temperature.

FIGS. 11a & 11b are a series of timing diagrams illustrating an embodiment of a CPU/GPU DCVS co-optimization method for CPU/GPU parallelized graphics workloads.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
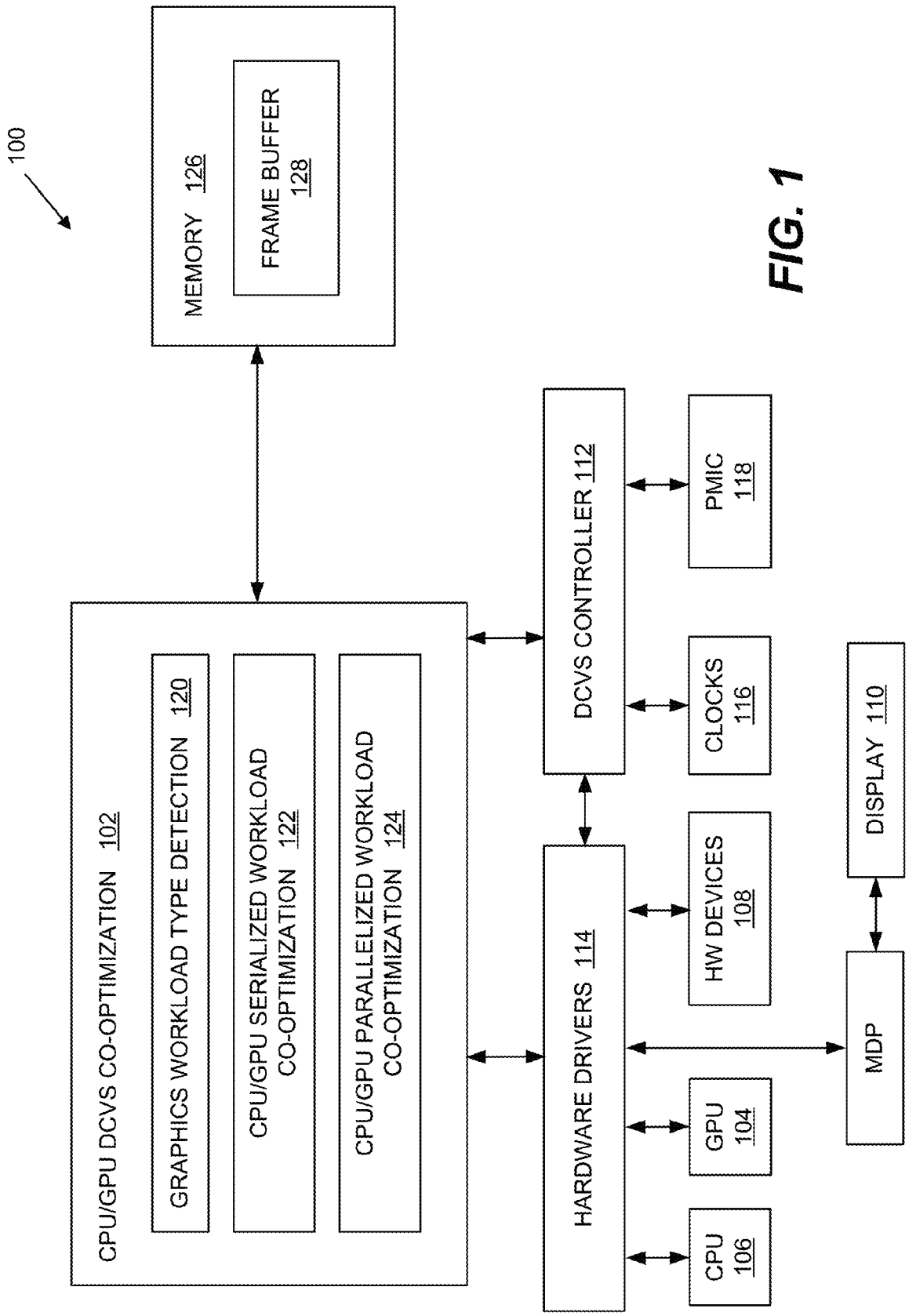
FIG. 1 is a block diagram of an embodiment of a system for co-optimizing central processing unit (CPU) and graphics processing unit (GPU) dynamic clock and voltage/frequency scaling (DCVS) in graphics frame processing.

FIG. 1 illustrates a system 100 for co-optimizing dynamic clock and voltage/frequency scaling (DCVS) levels of a central processing unit (CPU) 106 and a graphics processing unit (GPU) 104 during graphics frame processing (referred to as "CPU/GPU DCVS co-optimization"). The graphics frame processing may involve any workload in which the CPU 106 and the GPU 104 cooperatively perform the frame processing. For example, the graphics frame processing may involve a CPU/GPU serialized workload and/or a CPU/GPU parallelized workload. As known in the art, a CPU/GPU serialized workload involves consecutive processing by the CPU 106 and the GPU 104 for each graphics frame. For each frame, the CPU 106 starts the processing and provides output to the GPU 104, which performs additional processing. The GPU 104 transfers the resulting output to the display 110 via, for example, a mobile display processor.

One of ordinary skill in the art will appreciate that a CPU/GPU parallelized workload involves parallel processing by the CPU 106 and the GPU 104. The CPU 106 starts processing for a frame (n) and stores the resulting output in a frame buffer 128 of a memory 126. During the next period, the GPU 104 retrieves the output stored in the frame buffer 128 and performs additional processing for frame (n) while the CPU 106 processes a frame (n+1) and stores the corresponding output in the frame buffer 128. The process repeats for each subsequent frame. While this process results in a single frame delay, it provides performance advantages due to CPU/GPU parallel processing.

It should be appreciated that the term CPU/GPU DCVS co-optimization refers to jointly optimizing a DCVS level for both the GPU 104 and the CPU 106 such that the combined power consumption of the GPU 104 and the CPU 106 is minimized. In other words, the system 100 determines an optimal combination of a GPU DCVS level and a CPU DCVS level for the DCVS controller 112, which provides the lowest overall CPU and GPU power consumption during the graphics frame processing.

The system 100 may be implemented in any multiprocessor computing device, including a personal computer, a workstation, a server, a portable computing device (PCD), such as a cellular telephone, a portable digital assistant (PDA), a portable game console, a palmtop computer, or a tablet computer. In an embodiment, one or more of the system components illustrated in FIG. 1 may be incorporated on a system on chip (SoC) coupled to a memory system (e.g., dynamic random access memory (DRAM)) or other types of memory. As illustrated in FIG. 1, the system 100 comprises one or more processing devices, units, or cores (e.g., CPU 106, GPU 104). The system 100 may further comprise any other general or specific-purpose hardware devices, such as, for example, digital signal processor(s), mobile display processor, video encoders, etc.

The CPU 106, the GPU 104, and any other hardware devices 108 may be connected to a respective hardware driver 114. As known in the art, the hardware drivers 114 provides a software interface to the respective hardware devices, enabling operating systems and other computer programs to access hardware functions without needing to know precise details of the hardware being used. The hardware drivers 114 are electrically coupled to a DCVS controller 112. The DCVS controller 112 is configured to implement the system DCVS techniques by controlling the frequency and/or voltage provided to the CPU 106, the GPU 104, and the hardware devices 108. The DCVS controller 112 may adjust the frequency and/or voltage at which the devices operate via interfaces to, for example, one or more clocks 116, a power management integrated circuit (PMIC) 118, etc.

As mentioned above, during graphics frame processing, the DCVS controller 112 may interface with the CPU/GPU DCVS co-optimization module(s) 102 to jointly optimize DCVS levels for both the GPU 104 and the CPU 106 to provide the lowest overall CPU and GPU power consumption. In the embodiment of FIG. 1 and as described below in more detail, the CPU/GPU DCVS co-optimization module(s) 102 comprise a graphics workload type detection module 120, which is configured to determine whether the graphics workload comprises a CPU/GPU serialized workload or a CPU/GPU parallelized workload. If the graphics workload is serialized, CPU/GPU DCVS co-optimization is performed by module(s) 122. If the graphics workload is parallelized, CPU/GPU DCVS co-optimization is performed by module(s) 124.

Figure 2:
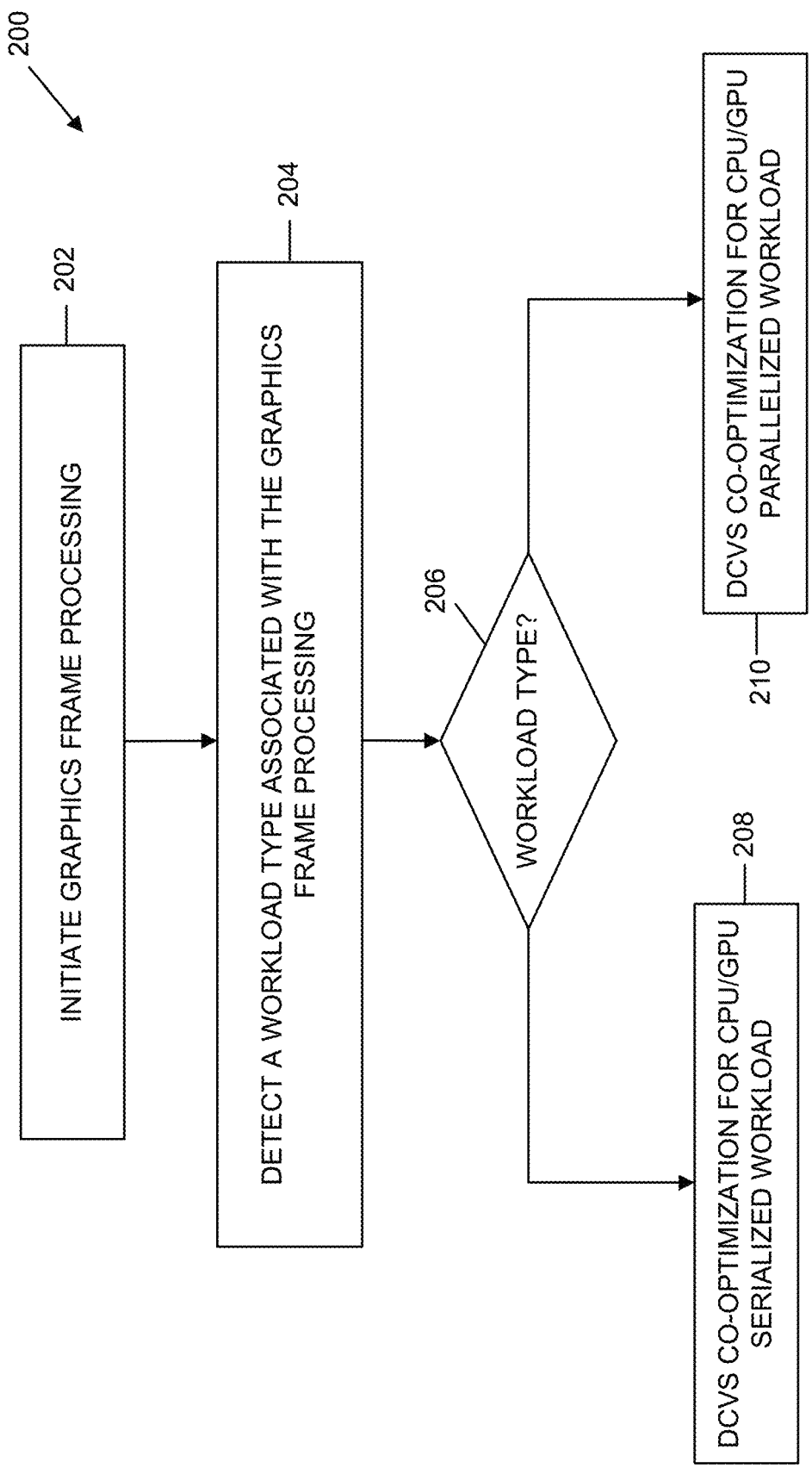
FIG. 2 is a flowchart of an embodiment of a method implemented in the system of FIG. 1 for selecting DCVS co-optimization algorithms according to a detected graphics workload type.

FIG. 2 is a flowchart of an embodiment of a method 200 implemented in the system of FIG. 1 for controlling various CPU/GPU DCVS co-optimization algorithms according to a detected graphics workload type. At block 202, the system 100 may initiate graphics frame processing. At block 204, the graphics workload type detection module 120 detects a workload type associated with the graphics frame processing. In an embodiment, the workload type detection may be performed by a GPU driver. The detected workload type may comprise a CPU/GPU serialized workload or a CPU/GPU parallelized workload. The workload type may be detected in various ways. In one embodiment, a GPU driver may determine whether a frame buffer object (FBO) has been created. If a FBO is created, the system 100 may determine that the graphics workload type is CPU/GPU serialized. If a FBO is not created, the system may determine that the graphics workload type is CPU/GPU parallelized.

Another detection method may involve investigating profile frame processing. If it is determined that processing for a frame (n+1) only starts after frame (n) processing is completed, the system 100 may determine that the graphics workload type is CPU/GPU serialized. This may be assumed where, for example, the start time for frame (n+1) is approximately equal to the end time of frame (n) processing. If, however, processing for the frame (n+1) can start regardless of the status of frame (n) processing, the system 100 may determine that the graphics workload type is CPU/GPU parallelized. This may be assumed where, for example, the start time for frame (n+1) occurs before the end time of frame (n) processing.

The workload type may also be determined based on graphics performance benchmarks. For example, a data table may specify that certain types of benchmarks or performance and/or usage scenarios should be associated with CPU/GPU serialized workloads while others associated with CPU/GPU parallelized workloads.

Regardless of the workload type detection method, the module 120 controls (decision block 206) which CPU/GPU DCVS co-optimization algorithm should be applied. For serialized workloads, one of a set of CPU/GPU serialized DCVS co-optimization algorithms may be applied (block 208). For parallelized workloads, one of a set of CPU/GPU parallelized DCVS co-optimization algorithms may be applied (block 210).

Figure 3:
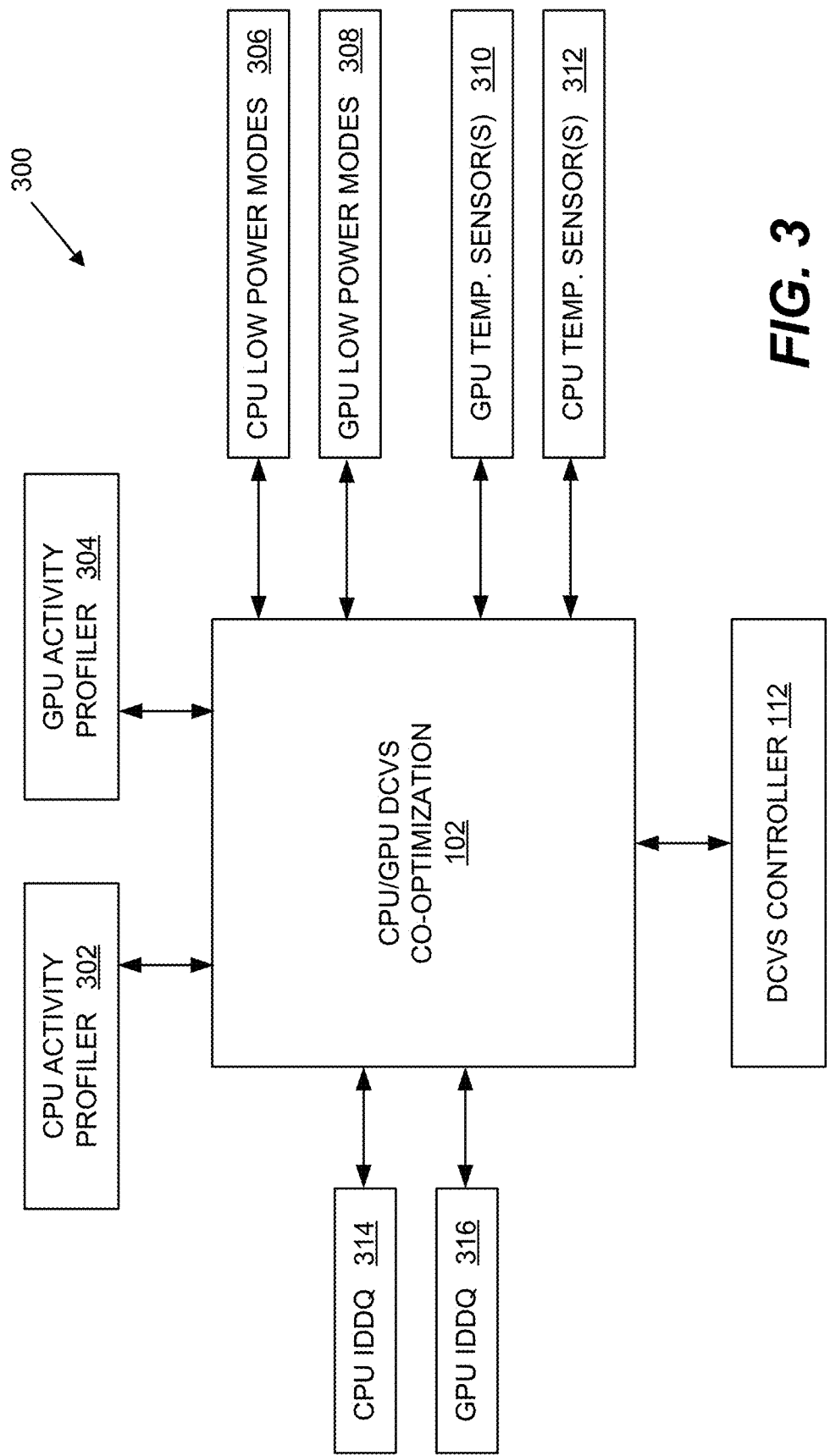
FIG. 3 is a block diagram illustrating exemplary data inputs and outputs for the CPU/GPU DCVS co-optimization module(s) in the system of FIG. 1.

FIG. 3 is a block diagram illustrating exemplary data inputs used by the CPU/GPU DCVS co-optimization module(s) 102 for jointly optimizing the GPU and CPU DCVS levels to minimize the combined power consumption of the CPU 106 and the GPU 104 during graphics frame processing. As described below in more detail, the various types of data are used to determine an optimal operating point (i.e., GPU and CPU DCVS levels) for the lowest combined CPU and GPU power consumption while observing frame deadline(s). In an embodiment, the CPU/GPU DCVS co-optimization module(s) 102 may be configured to determine the optimal operating point constrained by the conditions in Equations 1-4.

$$\text{CPU active time+GPU active<frame period=1/frames per second (FPS)} \quad \text{Equation 1}$$

$$\text{CPU } F\text{min<CPU frequency<CPU } F\text{max;} \quad \text{Equation 2}$$

wherein Fmin is a minimum CPU frequency; and Fmax is a maximum CPU frequency $$\text{GPU } F\text{min<GPU frequency<GPU } F\text{max;} \quad \text{Equation 3}$$

wherein Fmin is a minimum GPU frequency; and Fmax is a maximum GPU frequency $$\text{Minimal Total Avg. SoC Power Consumption=CPU power+GPU power+others} \quad \text{Equation 4}$$

Referring to FIG. 3, the CPU/GPU DCVS co-optimization module(s) 102 may obtain various types of activity data from the CPU 106 and the GPU 104 (i.e., referred to as CPU activity data and GPU activity data, respectively). The activity data may be received from the CPU activity profiler 302 and the GPU activity profiler 304. As known in the art, the activity profilers 302 and 304 may obtain relevant data from, for example, respective CPU and GPU drivers, counters, registers, other hardware, etc. The activity data may include any of the following, or other, types of data related to CPU and/or GPU activity: workload, active time, idle time, waiting time, etc. The CPU/GPU DCVS co-optimization module(s) 102 may determine possible low power modes associated with the CPU 106 (CPU low power modes 306) and the GPU 104 (GPU low power modes 308). The low power modes may comprise a list or table of respective DCVS levels or operating frequencies, etc. It should be appreciated that the CPU low power modes may involve any of the following functions, features, or variables: clock gating modes, retention with lower voltage, power gating, etc. The GPU low power modes may involve, for example, spatial peak temporal peak (SPTP) power collapse, GFX power collapse, etc.

As further illustrated in FIG. 3, CPU/GPU DCVS co-optimization may also incorporate temperature data from CPU temperature sensor(s) 312 and GPU temperature sensor(s) 310, as well as quiescent state supply current (IDDQ) leakage data associated with the CPU (IDDQ leakage data 314) and the GPU (IDDQ leakage data 316). One of ordinary skill in the art will appreciate that the optimal CPU/CPU operating point for minimizing the combined CPU and GPU power consumption may be determined based on one or more of the data illustrated in FIG. 3. The CPU/GPU DCVS co-optimization module 102 provides the optimal CPU/GPU operating point to the DCVS controller 112, which adjusts the CPU 106 and the GPU 104 via, for example, the clocks 116 and/or the PMIC 118 (FIG. 1).

Figure 4:
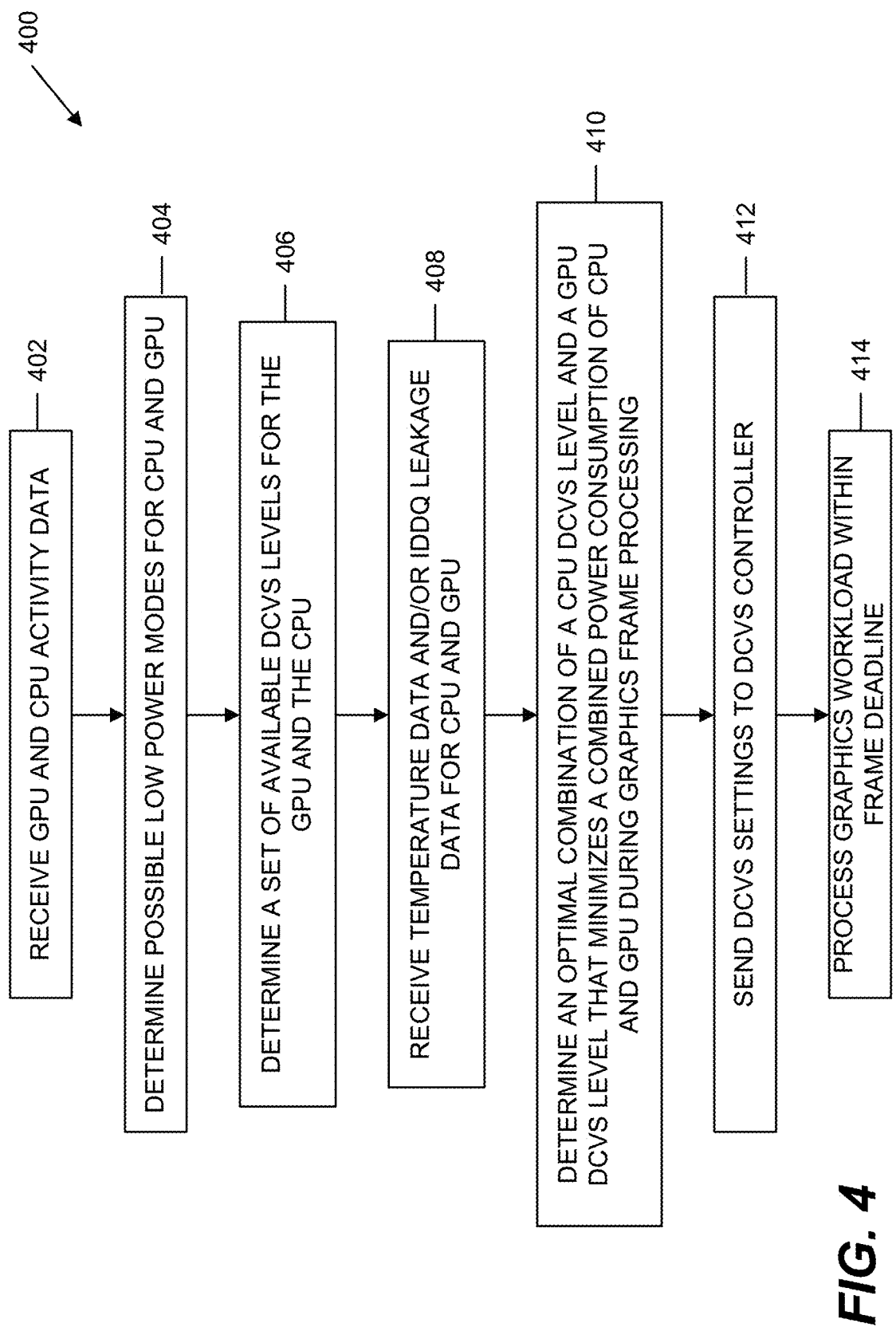
FIG. 4 is a flowchart illustrating an embodiment of a method implemented in the system of FIG. 1 for co-optimizing CPU and GPU DCVS to minimize power consumption during graphics frame processing.

FIG. 4 is a flowchart illustrating an embodiment of a method 400 implemented in the system 100 for co-optimizing CPU and GPU DCVS to minimize power consumption during graphics frame processing. At block 402, GPU and CPU activity data are received from, for example, the CPU activity profiler 302 and the GPU activity profiler 304. The CPU/GPU DCVS co-optimization module(s) 102 may determine possible low power modes for the CPU 106 and the GPU 104 (block 404) and/or respective DCVS levels, operating frequencies, etc. (block 406) or as otherwise described above. At block 408, the CPU/GPU DCVS co-optimization module(s) 102 may receive temperature data and/or IDDQ leakage data for the CPU 106 and the GPU 104. Based one or more of the data received and/or determined in blocks 402, 404, 406, and 408, the CPU/GPU DCVS co-optimization module(s) 102 selects the appropriate co-optimization algorithms according to the graphics workload type, and determines (block 410) an optimal combination of a CPU DCVS level and a GPU DCVS level that minimizes the combined power consumption of the CPU 106 and the GPU 104 during graphics frame processing. At block 412, the optimal operating point (e.g., DCVS setting(s)) are transmitted to the DCVS controller 112, which controls the adjustments to the frequency and/or voltage of the CPU 106 and the GPU 104 for processing the graphics workload within the frame deadlines (block 414).

FIGS. 5a-5c are a series of timing diagrams for illustrating an embodiment of a CPU/GPU DCVS co-optimization method for a CPU/GPU serialized graphics workloads. FIGS. 5a & 5b illustrate conventional methods for minimizing overall CPU/GPU power consumption by independently optimizing CPU DCVS and GPU DCVS. FIG. 5a illustrates a first scenario comprising the lowest CPU frequency and the lowest GPU frequency.

As illustrated in FIG. 5a, the CPU frequency is 800 MHz and the GPU frequency is 579 MHz. The serialized workload is illustrated for the first three frames associated with the workload (i.e., frame n, frame (n+1), and frame (n+2) identified as frames 500, 502, and 504, respectively). Reference numerals 506a1, 506a2, and 506a3 illustrate the CPU processing in the respective frames 500, 502, and 504, respectively, while reference numerals 508a1, 508a2, and 508a3 illustrate the GPU processing. As illustrated in FIG. 5a, in frame 500, the GPU processing 508a1 occurs after the CPU processing 506a1. When GPU processing 508a1 is completed, the output is provided to the display 110. In frame 502, the GPU processing 508a2 occurs after the CPU processing 506a2. When GPU processing 508a2 is completed, the output is provided to the display 110. In frame 504, the GPU processing 508a3 occurs after the CPU processing 506a3. When GPU processing 508a3 is completed, the output is provided to the display 110. Simulated power consumption data for scenario 1 in FIG. 5a demonstrates that the total power consumption=CPU (559 mW)+GPU (1205 mW)=1764 mW.

FIG. 5b illustrates a second scenario comprising the highest CPU frequency and the highest GPU frequency. As illustrated in FIG. 5b, the CPU frequency is 2200 MHz and the GPU frequency is 625 MHz. Again, the serialized workload is illustrated for the first three frames 500, 502, 504. Reference numerals 506b1, 506b2, and 506b3 illustrate the CPU processing in the respective frames 500, 502, and 504, respectively, while reference numerals 508b1, 508b2, and 508b3 illustrate the GPU processing. Simulated power consumption data for scenario 2 in FIG. 5b demonstrates that the total power consumption=CPU (783 mW)+GPU (1206 mW)=1988 mW. By comparison to FIG. 5a, it should be appreciated that the width of the respective blocks is proportional to the amount of processing time. Compared to the blocks in FIG. 5a (which are processed at the lowest frequency), the blocks in FIG. 5b use less processing time due to the higher frequency. The simulated data shows scenario 1 (FIG. 5a) better optimizes power consumption than scenario 2 (FIG. 5b).

FIG. 5c illustrates the same three frames 500, 502, 505 of the serialized workload in an exemplary implementation of the system 100. In this third scenario, the CPU frequency and the GPU frequency are jointly optimized, as described above. FIG. 5c illustrates that a co-optimization approach, as described above, provides a lower overall power consumption than the conventional approaches illustrated in FIG. 5a (i.e., lowest frequency of both CPU and GPU) and FIG. 5b (i.e., highest frequency of both CPU and GPU). In the example of FIG. 5c, the overall power consumption is minimized wherein the CPU frequency is 1000 MHz and the GPU frequency is 475 MHz. The simulated power consumption data for scenario 3 in FIG. 5c demonstrates that the total power consumption=CPU (554 mW)+GPU (1204 mW)=1757 mW. This co-optimization approach in scenario 3 (FIG. 5c) results in the lowest power consumption compared to conventional methods in the scenarios 1 and 2 (FIGS. 5a and 5b).

Figures 6, 7, 8:
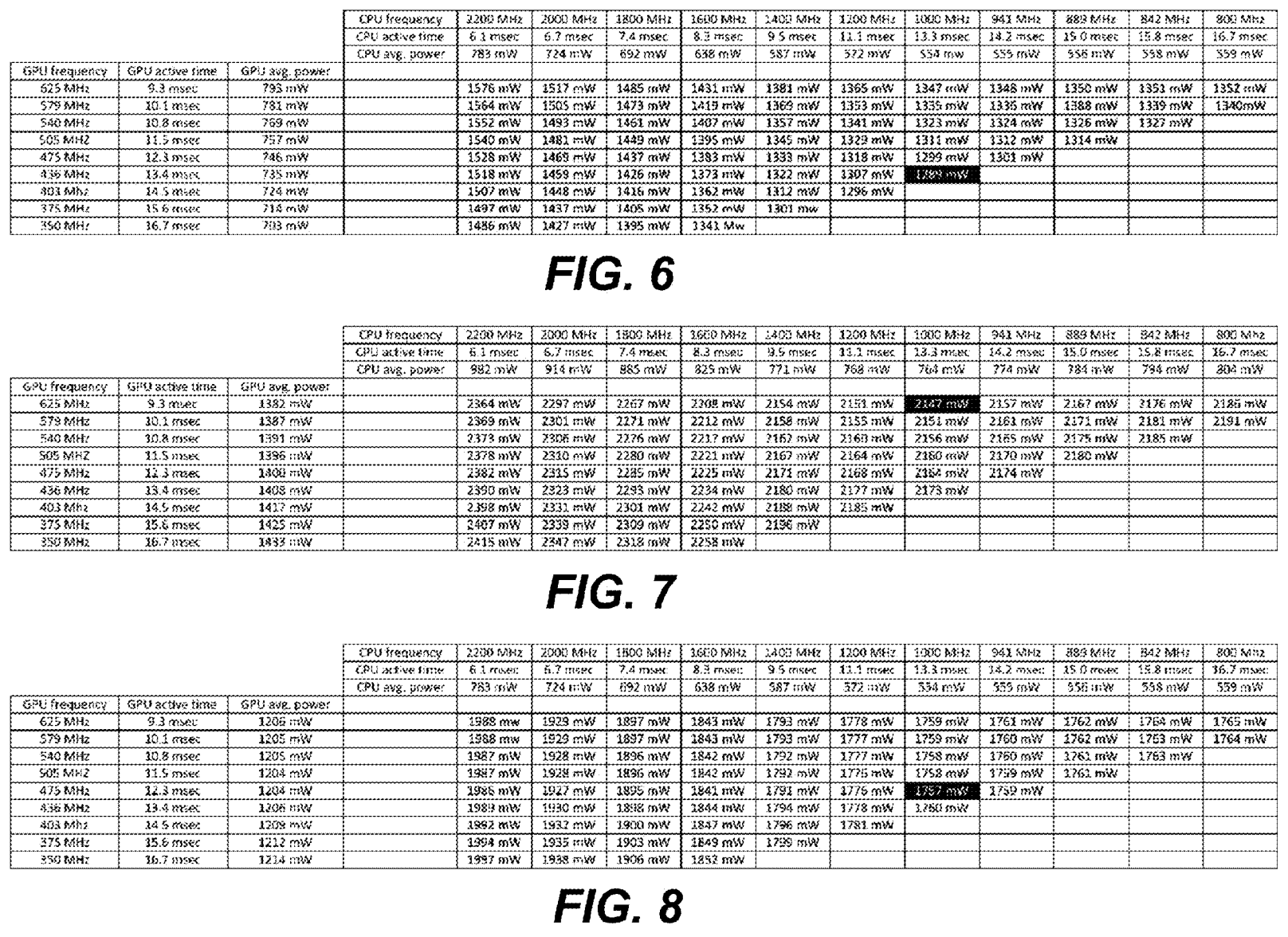

FIGS. 6-8 comprise data tables illustrating estimated GPU and CPU power consumption for various combinations of GPU and CPU DCVS levels in an exemplary serialized workload. It should be appreciated that the data tables illustrate that the combined CPU/GPU power consumption is a non-linear, convex relationship in the exemplary CPU/GPU frequency space. Each data table shows estimated average CPU and GPU power according to various combinations of frequency and activity times. FIG. 6 illustrates a first example in which the temperature of the CPU 106 and the GPU 104 are approximately 55 degrees Celsius. FIG. 7 illustrates a second example in which the temperature of the CPU 106 and the GPU 104 are approximately 85 degrees Celsius. FIG. 8 illustrates a third example in which the temperature of the CPU 106 is approximately 55 degrees Celsius and the temperature of the GPU 104 is approximately 80 degrees Celsius.

In each of FIGS. 6-8, the GPU combinations are listed in the three columns on the left of each table, and the CPU combinations are listed in the three rows on the top of each table. The greyed-out cells illustrate the estimated total CPU and GPU power according to the various combinations. The blacked-out cell in each table identifies the optimal operating point in the CPU/GPU frequency space for minimizing the combined CPU and GPU power consumption. FIGS. 6-8 show that that the optimal operating point varies depending on CPU and GPU temperature changes, and this is the reason why the method in FIG. 3 and FIG. 4 utilizes IDDQ (leakage) and temperature information to determine the optimal operating point of the CPU and the GPU.

Figure 9:
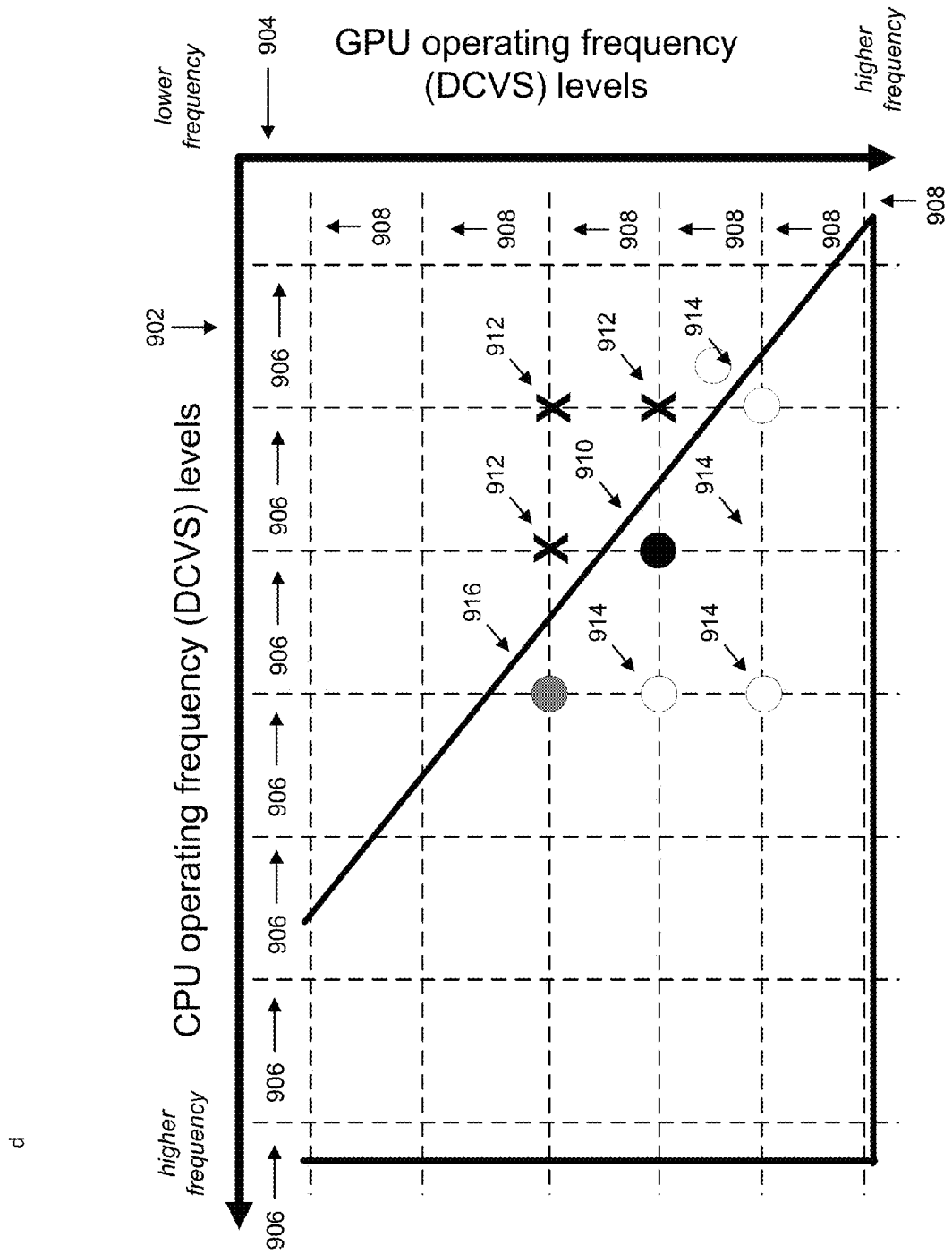
FIG. 9 illustrates an embodiment of a CPU/GPU DCVS co-optimization algorithm implementing a gradient descent search method.

It should be appreciated that the CPU/GPU DCVS co-optimization module(s) 102 may be configured to estimate respective CPU and GPU power within any desirable frequency space and based on any of the input data described above. Furthermore, the various optimization algorithms may be employed. FIG. 9 illustrates an exemplary implementation of a gradient descent search method. CPU operating frequency (DCVS) levels are represented along the x-axis 902 by vertical dashed lines 906. GPU operating frequency (DCVS) levels are represented along the y-axis 904 by horizontal dashed lines 908. The intersection of lines 908 and 906 define available operating points for co-optimizing the CPU and GPU DCVS levels.

In the example of FIG. 9, operating point 910 (illustrated as a black circle) represents a current operating point of the CPU 106 and the GPU 104. The optimization algorithm may be configured to estimate power consumption of adjacent DCVS operating points to determine if there is a lower-power operating point. It may be determined that operating points 912 (illustrated with an X) yield lower overall power consumption but do not meet frame deadlines and, therefore, are not considered. The triangular bounded area represents combinations of CPU/GPU DCVS levels that would meet the frame processing deadlines. Operating points 914 (illustrated with a white circle) may be determined to yield lower overall power consumption and meet frame deadlines. However, an operating point 916 (illustrated with a greyed-out circle) may be identified as an optimal new operating point because it not only meets frame deadlines but yields the lowest overall combined CPU/GPU power consumption of all adjacent operating points. One of ordinary skill in the art will appreciate that other optimization methods may be implemented including, for example, branch and bound tree search or any other desirable method.

Figure 10:
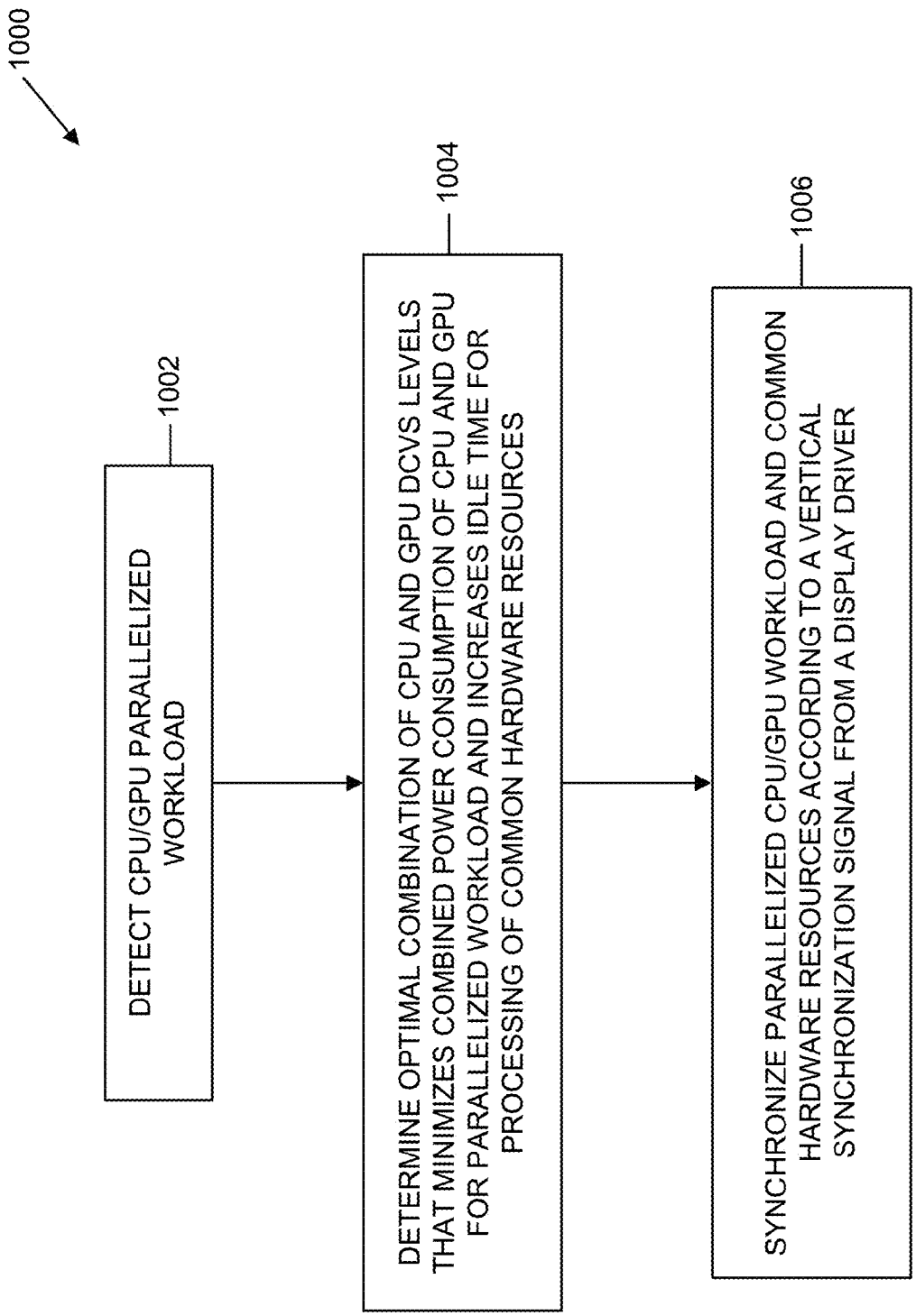
FIG. 10 is a flowchart illustrating an embodiment of a method implemented in the system of FIG. 1 for co-optimizing CPU and GPU DCVS levels for CPU/GPU parallelized graphics workloads.

FIG. 10 is a flowchart illustrating an embodiment of a method 1000 implemented in the system of FIG. 1 for co-optimizing CPU and GPU DCVS levels for CPU/GPU parallelized graphics workloads. At block 1002, the CPU/GPU DCVS co-optimization module(s) 102 detect a parallelized workload in the manner described above. At block 1004, the optimal combination of CPU and GPU DCVS levels may be determined based on any of the input data (FIG. 3) that minimizes the combined power consumption of the CPU 106 and the GPU 104 for the parallelized workload. The system 100 may also determine appropriate DCVS levels or other operating conditions for increasing the idle time of common hardware resources (hardware devices 118—FIG. 1). As illustrated in FIG. 11b, the parallelized CPU/GPU workload and processing for the common hardware resources may be synchronized according to a vertical synchronization (Vsync) signal 1109 from a display driver for display 110. FIG. 11a illustrates a comparative example in which vertical synchronization is employed for a serialized workload rather than a parallelized workload. It should be appreciated that by including vertical synchronization with a co-optimized CPU/GPU parallelized workload (as illustrated in FIG. 11b) the idle time of the common hardware resources may be significantly increased, yielding a much more efficient usage of the common hardware resources with the co-optimized CPU/GPU DCVS levels.

Referring to FIGS. 11a and 11b, CPU processing during frames 1102, 1104, 1106, and 1108 is represented by reference numerals 1110a, 1110b, 1110c, and 1110d. GPU processing in FIG. 11a (serialized workload) is represented by reference numerals 1112a, 1112b, 1112c, and 1112d. GPU processing in FIG. 11b (parallelized workload) is represented by reference numerals 1112a, 1112b, and 1112c, accounting for the one frame delay inherent in parallelized workloads. Processing for the common hardware resources during frames 1102, 1104, 1106, and 1108 is represented by reference numerals 1114a, 1114b, 1114c, and 1114d, respectively. FIG. 11b shows that by combining vertical synchronization with a CPU/GPU parallelized workload, the idle time of the common hardware resources may be increased (illustrated by the narrower processing blocks in FIG. 11b than in FIG. 11a).

Figure 12:
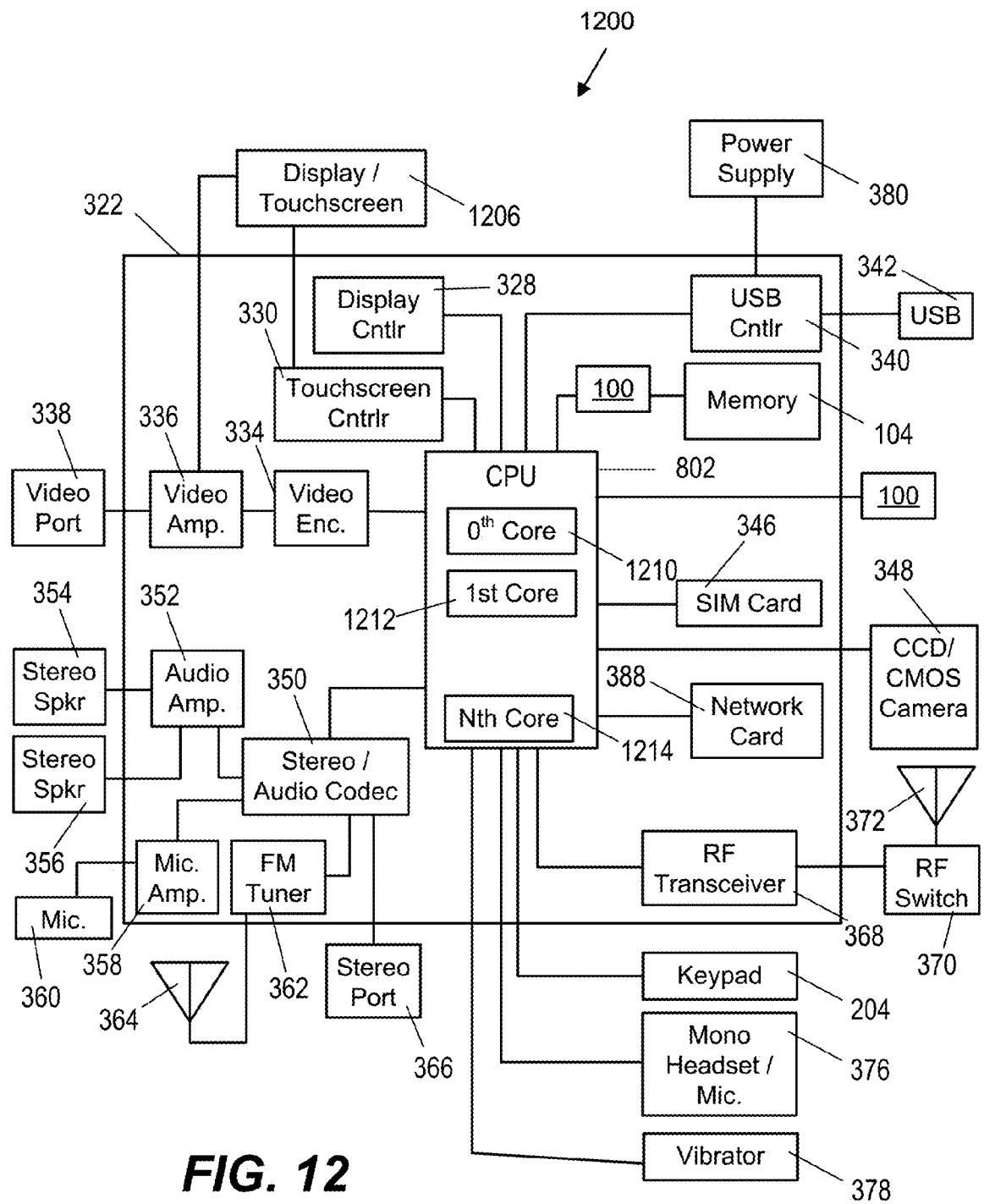
FIG. 12 is a block diagram of an embodiment of a portable computer device comprising the system of FIG. 1.

As mentioned above, the system 100 may be incorporated into any desirable computing system. FIG. 12 illustrates the system 100 incorporated in an exemplary portable computing device (PCD) 1200. It will be readily appreciated that certain components of the system 100 (e.g., CPU/GPU DCVS co-optimization module(s) 102, CPU 106, GPU 104) may be included on the SoC 322 (FIG. 12) while other components (e.g., memory 126, display 110) may be external components coupled to the SoC 322. The SoC 322 may include a multicore CPU 1202. The multicore CPU 1202 may include a zeroth core 1210, a first core 1212, and an Nth core 1214. One of the cores may comprise GPU 104 with one or more of the others comprising the CPU 106.

A display controller 328 and a touch screen controller 330 may be coupled to the CPU 1202. In turn, the touch screen display 1206 external to the on-chip system 322 may be coupled to the display controller 328 and the touch screen controller 330.

FIG. 12 further shows that a video encoder 334 (e.g., a phase alternating line (PAL) encoder, a sequential color a memoire (SECAM) encoder, or a national television system(s) committee (NTSC) encoder) is coupled to the multicore CPU 1202. Further, a video amplifier 336 is coupled to the video encoder 334 and the touch screen display 1206. Also, a video port 338 is coupled to the video amplifier 336. As shown in FIG. 12, a universal serial bus (USB) controller 340 is coupled to the multicore CPU 1202. Also, a USB port 342 is coupled to the USB controller 340. Memory 104 and a subscriber identity module (SIM) card 346 may also be coupled to the multicore CPU 1202. Memory 104 may reside on the SoC 322 or be coupled to the SoC 322. The memory 104 may comprise a DRAM memory system.

Further, as shown in FIG. 12, a digital camera 348 may be coupled to the multicore CPU 1202. In an exemplary aspect, the digital camera 348 is a charge-coupled device (CCD) camera or a complementary metal-oxide semiconductor (CMOS) camera.

As further illustrated in FIG. 12, a stereo audio coder-decoder (CODEC) 350 may be coupled to the multicore CPU 1202. Moreover, an audio amplifier 352 may coupled to the stereo audio CODEC 350. In an exemplary aspect, a first stereo speaker 354 and a second stereo speaker 356 are coupled to the audio amplifier 352. FIG. 12 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 12 further illustrates that a radio frequency (RF) transceiver 368 may be coupled to the multicore CPU 1202. An RF switch 370 may be coupled to the RF transceiver 368 and an RF antenna 372. A keypad 204 may be coupled to the multicore CPU 1202. Also, a mono headset with a microphone 376 may be coupled to the multicore CPU 1202. Further, a vibrator device 378 may be coupled to the multicore CPU 1202.

FIG. 12 also shows that a power supply 380 may be coupled to the SoC 322. In a particular aspect, the power supply 380 is a direct current (DC) power supply that provides power to the various components of the PCD 1200 that require power. Further, in a particular aspect, the power supply is a rechargeable DC battery or a DC power supply that is derived from an alternating current (AC) to DC transformer that is connected to an AC power source.

FIG. 12 further indicates that the PCD 1200 may also include a network card 388 that may be used to access a data network (e.g., a local area network, a personal area network, or any other network). The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip (i.e., the network card 388 may be a full solution in a chip, and may not be a separate network card 388).

As depicted in FIG. 12, the touch screen display 1206, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the SoC 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for minimizing power consumption in graphics frame processing, the method comprising:
   initiating graphics frame processing to be performed by a central processing unit (CPU) and a graphics processing unit (GPU), wherein the frame processing comprises a CPU/GPU serialized workload;
   receiving CPU activity data and GPU activity data;
   determining a set of available dynamic clock and voltage/frequency scaling (DCVS) levels for the GPU and the CPU; and
   selecting from the set of available DCVS levels a combination of a GPU DCVS level and a CPU DCVS level, based on the CPU and GPU activity data, which reduces a combined power consumption of the CPU and the GPU during the graphics frame processing, wherein the combination of the GPU DCVS level and the CPU DCVS level comprises an operating point in a CPU/GPU frequency space that reduces the combined power consumption of the CPU and the GPU during the CPU/GPU serialized workload.

2. The method of claim 1, wherein the CPU activity data and the GPU activity data are received from a respective activity profiler associated with the CPU and the GPU.

3. The method of claim 1, wherein the CPU and GPU activity data comprise data specifying one or more of a processor workload, an active time, an idle time, and a waiting time.

4. The method of claim 1, further comprising:
   receiving temperature data from one or more of at least one CPU temperature sensor and at least one GPU temperature sensor; and
   receiving quiescent state supply current leakage (IDDQ) data associated with one or more of the GPU and the CPU;
   wherein the combination of the GPU and CPU DCVS levels are selected based on the CPU and GPU activity data and one or more of the temperature data and the IDDQ data.

5. A system for minimizing power consumption in graphics frame processing, the system comprising:
   means for initiating graphics frame processing to be performed by a central processing unit (CPU) and a graphics processing unit (GPU), wherein the frame processing comprises a CPU/GPU serialized workload;
   means for receiving CPU activity data and GPU activity data;
   means for determining a set of available dynamic clock and voltage/frequency scaling (DCVS) levels for the GPU and the CPU; and
   means for selecting from the set of available DCVS levels a combination of a GPU DCVS level and a CPU DCVS level, based on the CPU and GPU activity data, which reduces a combined power consumption of the CPU and the GPU during the graphics frame processing, wherein the combination of the GPU DCVS level and the CPU DCVS level comprises an operating point in a CPU/GPU frequency space that reduces the combined power consumption of the CPU and the GPU during the CPU/GPU serialized workload.

6. The system of claim 5, wherein the CPU activity data and the GPU activity data are received from a respective activity profiler associated with the CPU and the GPU.

7. The system of claim 5, wherein the CPU and GPU activity data comprise data specifying one or more of a processor workload, an active time, an idle time, and a waiting time.

8. The system of claim 5, further comprising:
   means for receiving temperature data from one or more of at least one CPU temperature sensor and at least one GPU temperature sensor; and
   means for receiving quiescent state supply current leakage (IDDQ) data associated with one or more of the GPU and the CPU;
   wherein the combination of the GPU and CPU DCVS levels are selected based on the CPU and GPU activity data and one or more of the temperature data and the IDDQ data.

9. A non-transitory computer-readable medium storing a computer program that is executed by a processor for minimizing power consumption in graphics frame processing, the computer program comprising logic configured to:
   initiate graphics frame processing to be performed by a central processing unit (CPU) and a graphics processing unit (GPU), wherein the frame processing comprises a CPU/GPU serialized workload;
   receive CPU activity data and GPU activity data;
   determine a set of available dynamic clock and voltage/frequency scaling (DCVS) levels for the GPU and the CPU; and
   select from the set of available DCVS levels a combination of a GPU DCVS level and a CPU DCVS level, based on the CPU and GPU activity data, which reduces a combined power consumption of the CPU and the GPU during the graphics frame processing, wherein the combination of the GPU DCVS level and the CPU DCVS level comprises an operating point in a CPU/GPU frequency space that reduces the combined power consumption of the CPU and the GPU during the CPU/GPU serialized workload.

10. The non-transitory computer-readable medium of claim 9, wherein the CPU activity data and the GPU activity data are received from a respective activity profiler associated with the CPU and the GPU.

11. The non-transitory computer-readable medium of claim 9, wherein the CPU and GPU activity data comprise data specifying one or more of a processor workload, an active time, an idle time, and a waiting time.

12. The non-transitory computer-readable medium of claim 9, further comprising logic configured to:
   receive temperature data from one or more of at least one CPU temperature sensor and at least one GPU temperature sensor; and
   receive quiescent state supply current leakage (IDDQ) data associated with one or more of the GPU and the CPU;
   wherein the combination of the GPU and CPU DCVS levels are selected based on the CPU and GPU activity data and one or more of the temperature data and the IDDQ data.

13. A system for minimizing power consumption in graphics frame processing, the system comprising:
   a system on chip (SoC) comprising a central processing unit (CPU), a graphics processing unit (GPU), and a dynamic clock and voltage/frequency scaling (DCVS) controller in communication with the GPU and the CPU; and
   a CPU/GPU DCVS co-optimization module configured to determine a combination of a GPU DCVS level and a CPU DCVS level for the DCVS controller, based on CPU and GPU activity data, which reduces a combined power consumption of the CPU and the GPU during graphics frame processing, wherein the graphics frame processing comprises a CPU/GPU serialized workload and the optimal combination of the GPU DCVS level and the CPU DCVS level comprises an operating point in a CPU/GPU frequency space that reduces the combined power consumption of the CPU and the GPU during the CPU/GPU serialized workload.

14. The system of claim 13, wherein the CPU/GPU DCVS co-optimization module comprises logic configured to:
   determine a set of available dynamic clock and voltage/frequency scaling (DCVS) levels for the GPU and the CPU; and
   determine the combination of the GPU DCVS level and the CPU DCVS level from the set of available DCVS levels.

15. The system of claim 13, wherein the CPU and GPU activity data comprise data specifying one or more of a processor workload, an active time, an idle time, and a waiting time.

16. The system of claim 13, wherein the CPU/GPU DCVS co-optimization module comprises logic configured to:
   receive temperature data from one or more of at least one CPU temperature sensor and at least one GPU temperature sensor; and
   receive quiescent state supply current leakage (IDDQ) data associated with one or more of the GPU and the CPU;
   wherein the combination of the GPU and CPU DCVS levels are selected based on the CPU and GPU activity data and one or more of the temperature data and the IDDQ data.

* * * * *